United States Patent [19]

Kalley

[11] Patent Number: 5,674,000
[45] Date of Patent: Oct. 7, 1997

[54] LIGHT SOURCE FOR USE IN LEAK DETECTION IN HEATING, VENTILATING, AND AIR CONDITIONING SYSTEMS THAT UTILIZE ENVIRONMENTALLY-SAFE MATERIALS

[75] Inventor: Terrence D. Kalley, Troy, Mich.

[73] Assignee: Bright Solutions, Inc., Troy, Mich.

[21] Appl. No.: 598,435

[22] Filed: Feb. 8, 1996

[51] Int. Cl.[6] .................................................. F29V 29/00
[52] U.S. Cl. .......................... 362/293; 362/264; 362/294; 362/306
[58] Field of Search ................................... 362/293, 294, 362/306, 264

[56] References Cited

U.S. PATENT DOCUMENTS

| | | | |
|---|---|---|---|
| 4,780,799 | 10/1988 | Groh | 362/293 |
| 5,440,919 | 8/1995 | Cooper | 73/40.7 |

*Primary Examiner*—Ira S. Lazarus
*Assistant Examiner*—Alfred Basichas
*Attorney, Agent, or Firm*—Robert J. Black

[57] ABSTRACT

A light source for use in examining leak detection sites in heating, ventilating, and air conditioning systems that utilize a fluorescence-producing dye in the refrigerant to determine the presence of leaks. The light source combines a faceted reflector with a lamp and interference filter to provide a narrowed emission of wavelength of light emitted from the light source.

16 Claims, 1 Drawing Sheet

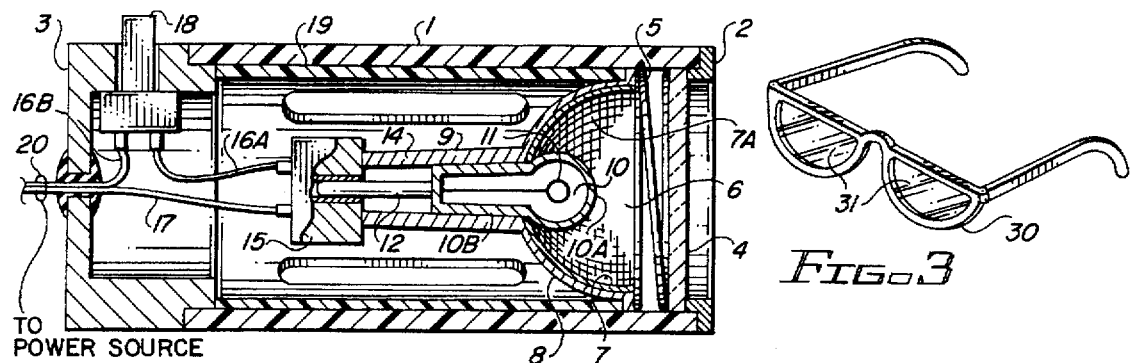
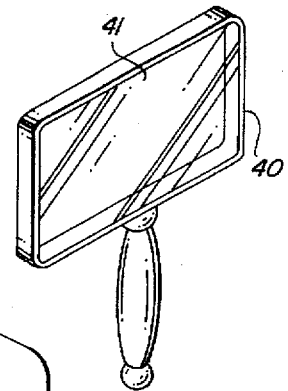
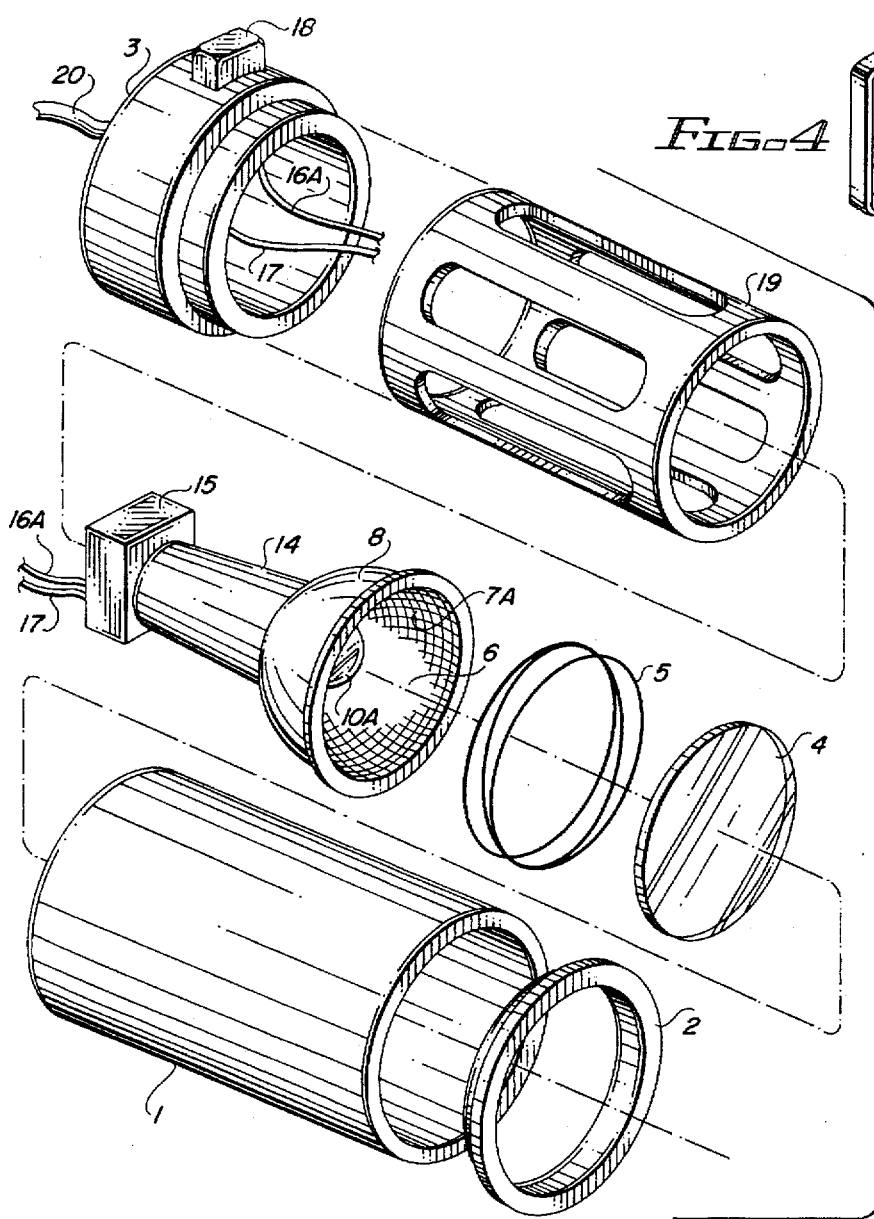

LIGHT SOURCE FOR USE IN LEAK DETECTION IN HEATING, VENTILATING, AND AIR CONDITIONING SYSTEMS THAT UTILIZE ENVIRONMENTALLY-SAFE MATERIALS

BACKGROUND OF THE INVENTION

1. Field of the Invention

The present invention relates to a light source for use in detecting leaks in heating, ventilating, and air conditioning systems. Particularly, the present invention relates to a light source which is able to detect substances which reemit light at wavelengths greater than the wavelength of light emitted from the light source.

2. Background Art

Because of the damage that chlorofluorocarbon (CFC) refrigerants are doing to the ozone layer, it has become necessary to develop alternative refrigerants which are environmentally "friendly". DuPont, International Chemicals, and others have developed hydrofluorocarbon (HFC) refrigerants which are much safer for the environment and have an ozone depletion factor ranging from zero to a fraction of the ozone depletion factor of CFC refrigerants.

By means of the addition of certain dyes to the refrigerants and/or lubricants, such as naphthalimide, perylene, thioxanthane, coumarin, or fluorescene, leaks can be detected by the presence of a fluorescence existing at leak sites when examined under light sources having appropriate or specific characteristics. Such leak detection techniques are known and described in U.S. Pat. Nos. 5,357,782 and 5,421,192 which issued to Richard G. Henry on Oct. 25, 1994, and Jun. 6, 1995, respectively, both of which are assigned to the same assignee as the assignee of the present application.

It has been determined that in detecting the fluorescence present in such detection applications that optimum visibility of the fluorescence occurs when the leaks are detected under a light having an emission wavelength between 300 and 700 nanometers. In the past, ultraviolet light sources have been utilized for this particular usage, but have not provided the optimum performance inasmuch as they have generated light primarily in the ultraviolet range found normally between 300 to 450 nanometers.

A search of the background art directed at the subject matter of the present invention conducted in the U.S. Patent and Trademark Office disclosed the following U.S. Pat. Nos.:

| | | |
|---|---|---|
| 4,558,014 | 4,775,853 | 5,059,790 |
| 5,131,755 | 5,156,976 | 5,192,510 |
| 5,347,438 | 5,349,468 | 5,394,133 |
| 5,399,499 | 5,441,531 | |

Additional patents known to the Applicant of the present application include the following:

| | | | |
|---|---|---|---|
| 4,758,366 | 5,149,453 | 5,357,782 | 5,421,192 |

None of the above-identified patents are believed to claim, teach, or disclose the novel combination of elements and functions set forth in the present invention.

The intent of the present apparatus is to provide a light source that functions to provide an optimized unit for use in those industries or technologies that require the aiming of light in specific wavelengths at a substance to cause fluorescence. This is done in the leak detection industry, as well as in the non-destructive testing industry. In both instances, substances such as dyes will fluoresce brightly under light sources which emit light in the 300 to 500 nanometer range, whereas no, or minimal, fluorescence is detected under ambient light of typical wavelengths.

Historically, the light sources used for these types of applications were large alternating current lamps operating on either 110 to 220 volts. Such lamps, known as PAR 38, were manufactured by Phillips and other manufacturers. Usually, such lamps were in the 100–200 watt range, producing a substantial amount of light emitted outside of the desired range to produce the desired fluorescent response. These lamps also created a large amount of heat, and required the use of a ballast which provided additional bulk and weight.

Substantially later, self-ballasted lamps were developed overcoming some of the previous drawbacks. However, they were prone to relatively long warm-up periods and were very sensitive to voltage surges which would cause the light to be turned off, and subsequently required a lengthy cool-down period followed by another warm-up period.

More recently, small direct current lamps of the halogen type, or similar, rich in gases such as xenon were developed. Such lamps had the advantage of requiring no ballast, were small in dimension, light weight, and were not subject to voltage surges or spiking. They also provided portability and could be powered by batteries. Such lamps, however, did not provide a great output of light in the desirable ranges, and therefore did not fluoresce efficiently so as to observe materials with sufficient brightness to meet the needs of most users. This was probably the result of the usage of reflectors, which lack adequate beam focus to cause light of sufficient candle power at the site of fluorescence, i.e., the leak site.

Accordingly, it is the object of the present invention to provide a light source that is small, light weight, not subject to voltage surges, durable, and produces a large output of light in the wavelength required to effectively fluoresce the above-mentioned fluorescent dyes.

SUMMARY OF THE INVENTION

In the field of leak and crack detection and related non-destructive testing, different dyes are utilized which fluoresce at different wavelengths. Fluorescence is usually defined as the reemission of light at wavelengths greater than the wavelength of light emitted from the light source with which examination takes place.

The key to the lighting system of the present invention lies in the utilization of tungsten halogen lamps with an integral reflector, which provides an effective lighting system, with the characteristics being determined by the reflector design and the included lamp, as well as alignment of the lamp with the reflector. The usual single-ended tungsten halogen lamp as described herein is mounted in the axis of the reflector with the base pointing out from the reflector apex towards the rear. The reflectors provided are often focusing reflectors which concentrate the light generated by the built-in lamp to a more or less small or defined spot at a distance from the reflector and its axis.

Many of the reflectors utilized in the halogen lamps described utilize faceted or structured surfaces rather than smooth surfaces to modify light distribution. This arrangement improves the evenness of the light and can increase the beam angle, or smooth or break up the light-dark edges. Facets on the surfaces of the reflectors range from fine, scarcely visible grains to clearly visible faceting, with the effect being correspondingly less or more pronounced. With the combination of the correct reflector shape, such lamps are able to finely control focus. Smooth aluminum reflectors have been utilized but do not permit the geometric balances and dimensional stability that are provided by the glass reflectors found in newer halogen lamps. Accordingly, the material choice for such reflectors is usually glass, with the inner domed reflector surface being suitably coated to obtain the required reflective properties. These coatings are generally applied by vapor deposition. It is known that such glass reflectors have absolute dimensional stability and a surface that can be readily modified by applying coatings to the reflective surface.

Most recently, lamps, including precision engineered aluminum reflectors, have been developed. The combination of a high performance axial filament lamp with innovative faceted reflector designs resulted in producing a lamp having extremely high center beam candle power and a smooth beam pattern. Such lamps, with their durable, light weight faceted reflectors, have proved satisfactory for many of the same applications wherein glass lamps with an inner domed faceted reflector surface have been employed.

When material to be examined requires detection of fluorescence, the wavelength of the light to be emitted from the light source is to be more closely defined. Such precision of definition and control of wavelength may be controlled by use of reflectors with faceted surfaces.

Some white-light reflectors fluoresce dyes extremely well in that most fluorescent dyes are excited to fluorescence by light in the same nanometer range included in the output from the white-light reflectors, i.e., from 400 to 700 nanometers. Light produced outside these ranges is largely wasted and will not produce the desired fluorescence and can detract from the ability of a user to clearly see the fluorescence. Thus, faceted reflectors, are ideal in providing proper excitation wavelengths (for fluorescing materials) and providing precision not possible using other types of reflectors.

Such lamps are also effective at the spectral width in the range required for fluorescence, providing extremely strong intensity of light with the accurate focusing required for leak detection technology. Such an arrangement results in a focal point that can produce as high as 50,000 candle power from extremely small light sources, especially for beam spreads of 4° to 11°. In general, the narrower the beam spread, the greater the candle power and the greater the intensity of fluorescence created.

It is also possible to more narrowly define the spectral output from such reflector lamps by the utilization of optical filters. Light output from the reflector lamp is reduced to pass only the desired wavelength for the application. Generally, it is possible for two types of filters to be utilized, which may be absorption or dichroic filters. The dichroic filters operate on the principal of interference.

Additionally, it may be possible to further tailor light output from light sources in accordance with the present invention by the utilization of shields or eyewear by the user to permit only light of certain wavelengths to pass through. This eyewear can take several forms, including glasses, goggles, and face shields. Thus, the eyewear, when used in combination with filters, permits the ultimate fine tuning of wavelength for detection of fluorescence.

In the arrangement taught in the present invention, components consist of a housing wherein there is mounted a light source, including a reflector with a lamp included therein, with a reflective faceted surface surrounding the portion of the lamp that includes the filament. In addition, ahead of the lamp assembly is a filter lens, which in most cases is an absorption type filter that acts to further restrict the particular wavelength of the light emitted from the light source, controlling the light emitting therefrom to within the specific range reflected by the faceted reflector.

An on/off switch is also included within the container that provides control of the connection to an external power source for the light source. Thus, it can be seen that by means of the combination of the faceted reflector and an absorption-type filter placed ahead of the light source, a predetermined narrowed beam of light will be emitted from the light source of the present unit. Additional features and advantages of the invention will become apparent from the detailed description of the preferred embodiments of the invention as set forth in the following.

BRIEF DESCRIPTION OF THE DRAWINGS

Preferred embodiments of the invention will be described in detail with reference to the accompanying drawings wherein:

FIG. 1 is a sectional view of a light source for use in examination of substances which reemit light at a wavelength greater than the wavelength of the light emitted from the light source in accordance with the preferred embodiment of the present invention.

FIG. 2 is an exploded view of a light source in accordance with the present invention.

FIG. 3 is a perspective view of eyewear including long wavelength pass material for use in conjunction with the light source of the present invention.

FIG. 4 is a perspective view of a shield including long wavelength pass material for use in conjunction with the light source of the present invention.

DETAILED DESCRIPTION OF THE PREFERRED EMBODIMENTS

The present invention will best be understood by reference to the drawings wherein similar components are designated by the same referenced numerals.

Referring now to FIGS. 1 and 2, the preferred embodiment of the light source of the present invention consists of a housing constructed of phenolic, plastic or suitable material. The unit is cylindrical in construction and hollow and has affixed at either end thereto front cap 2 and rear cap 3, both caps being constructed of aluminum or other suitable materials. As may be seen in the drawings, front cap 2 is open to the exterior and has positioned directly behind it filter lens 4, which in the preferred embodiment consists of a BSI lens filter, No. PS-600. This filter provides maximum transmission of light at a wavelength of approximately 400 nanometers, wherein about 82% of the light at that wavelength is transmitted through the filter lens.

Located directly behind the filter lens 4 is a compression spring 5 which aides in positioning the lens and reflector 6 in proper spacial relationship within the housing and further provides some shock-absorbing assistance.

Reflector 6, located behind filter lens 4 and separated by compression spring 5, is either a molded glass reflector with an aluminized reflective faceted surface (TRU-AIM BRILLIANT MR16) or an aluminum reflector having a faceted surface (AR70).

It has been determined that as an alternative lamp 10 can utilize the Model AR111 lamp manufactured by Osram-Sylvania. This is an aluminum reflector lamp including a precision engineered faceted aluminum reflector which includes a precision mounted ultraviolet stop bulb. This unit produces excellent characteristics for reemission of fluorescent materials and provides a 4° beam spread. Slightly larger than the AR70 lamp indicated above, the housing would have to be increased proportionately. It has also been determined that this lamp produces excellent results (between 325 and 700 nanometers) without the use of filters between the substance to be examined and the lamp.

Most of the reflectors are used extensively to produce low-voltage, high-intensity lamps utilized for applications such as display lighting. As previously indicated, molded reflectors of the type described are typically finished with a faceted reflective front surface 9. This surface is configured to reflect visible light from the reflector. The front surface 9 is provided with facets 7A, while providing a uniform beam of illumination from lamp 10. The particular (tungsten halogen) lamp chosen herein provides a narrow spot type of beam. Extending from back surface 8 of reflector 6 is mounting portion 14. Lamp 10 has a filament portion 10A and a neck portion 10B, including therein is filament 11, which is connected at its rear to terminal 12 and terminal 13 (not shown). (Terminal 13 is not visible in the present view because it is parallel to terminal 12.) This light source is normally an incandescent light source, such as a halogen bulb, with the envelope consisting of filament portion 10A and neck portion 10B being constructed of glass or quartz. Lamp 10 is mounted in mounting portion 14 with the filament portion 10A extending beyond the front surface 9 of reflector 6, A socket 15 receiving terminals 12 and 13 provides connections to circuit conductors 16 and 17. Socket 15 is constructed of ceramic or similar material. Conductor portion 16A extends to on/off switch 18 and continues through conductor portion 16B to an external power source 20. The other conductor 17 extends directly from socket 15 to the power source 20.

Either of the lamps, as described herein, typically operates from a 12 volt source and draws approximately 50 watts of power. The power source 20 may consist of a battery, generator or dynamo. Switch 18 is utilized to turn the light source on or off during usage of the present novel light source to examine substances which reemit light at wavelengths greater than the wavelength of the light emitted from the light source of the present invention.

Heat shield 19 extends around the rear portion of reflector 6, mounting portion 14, and socket 15, and is held in place against the rear of reflector 6 by means of portions of rear cap 3. The heat shield assists in maintaining the present unit as comfortable to the touch during operation.

It should be noted that faceted reflectors as shown complete with a halogen lamp included therein are available from Osram-Sylvania and other sources as noted previously. The lamp 10, preferably is bonded to mounting portion 14 probably by means of a suitable adhesive, such as a silicon or epoxy based adhesive.

It should be noted that the unit as described includes a faceted reflector. Faceted reflectors produce specific reflection properties through the phenomenon of interference.

The effectiveness of the light source is enhanced when the user utilizes a shield 40 or eyewear 30 including long wavelength pass material 31 or 41 to further restrict the wavelength of light from the light source of the present invention.

While but a single embodiment of the present invention has been shown, it will be obvious to those skilled in the art that numerous modifications may be made without departing from the spirit of the present invention, which shall be limited only by the scope of the claims appended hereto.

What is claimed is:

1. A light source for examination of a substance which reemits light at a wavelength greater than the wavelength of light emitted from said light source, said light source comprising:
    a lamp assembly including;
        a faceted white light reflector;
        said faceted white light reflector is a focusing reflector;
        a lamp positioned between said faceted white light reflector and said substance;
        said lamp connected to a source of electrical power and operated in response to said electrical power to emit light;
        said faceted white light reflector functioning to reflect a selected portion of said light emitted from said lamp;
    a lens filter positioned between said lamp assembly and said substance;
    said lens filter operated to further restrict said light from said lamp and said light reflected by said faceted white light reflector;
    whereby said light emitted from said light source is restricted to a predetermined range effective to enhance the reemission of light from said substance.

2. A light source as claimed in claim 1 wherein:
    said lamp is a tungsten halogen lamp.

3. A light source as claimed in claim 1 wherein:
    said faceted reflector is made of aluminum.

4. A light source as claimed in claim 1 wherein:
    said faceted reflector is made of glass.

5. A light source as claimed in claim 4 wherein:
    said glass faceted reflector includes an aluminized surface.

6. A light source as claimed in claim 1 wherein:
    said lamp assembly further includes a protective shield functioning as an absorption filter.

7. A light source as claimed in claim 1 wherein:
    said lamp assembly is prefocused to a predetermined beam spread.

8. A light source as claimed in claim 1 wherein:
    said lens filter is an interference filter.

9. A light source as claimed in claim 1 wherein:
    said lens filter is an absorption filter.

10. A light source as claimed in claim 1 wherein:
    there is further included a shock absorbing compression spring positioned between said lamp and said lens filter functioning to maintain proper spacial relationship between said lamp and said filter lens.

11. A light source as claimed in claim 1 wherein:
    said substance is a leak detection dye.

12. A light source as claimed in claim 11 wherein:
    said dye is chosen from a group including naphthalimide, perylene, thioxanthine, coumarin, and fluorescene.

13. A light source as claimed in claim 1 wherein:
    said wavelength of light emitted from said source is further restricted by the utilization of filter lens eyewear, or in the alternative a filter shield, employed by a user of said light source.

14. A light source as claimed in claim 13 wherein:
    said wavelength of light emitted from said source is further restricted by the inclusion of long wavelength pass material in said filter lens eyewear or in the alternative included in said filter shield.

15. A light source for examination of a substance which reemits light at a wavelength greater than the wavelength of light emitted from said light source, said light source comprising:

a lamp assembly including;
- a faceted white light reflector reflecting light primarily in an emission range having a wavelength between 400 and 700 nanometers;
- said faceted white light reflector is a focusing reflector;
- a lamp positioned between said faceted reflector and said substance;
- said lamp connected to a source of electric power and operated in response to said electrical power to emit light;
- said faceted reflector functioning to reflect a selected portion of said light emitted from said lamp;
- whereby said light emitted from said light source is restricted to a predetermined range effective to enhance the reemission of light from said substance.

16. A light source for examination of a substance which reemits light at a wavelength greater than the wavelength of light emitted form light source, said light source comprising:

a lamp assembly including;
- a faceted white light reflector reflecting light primarily in an emission range having a wavelength of between 325 and 700 nanometers;
- said faceted reflector is a focusing reflector;
- a lamp positioned between said faceted reflector and said substance;
- said lamp connected to a source of electrical power and operated in response to said electrical power to emit light;
- said faceted reflector functioning to reflect a selected portion of said light emitted from said lamp;
- whereby said light emitted from said light source is restricted to a predetermined range effective to enhance the reemission of light form said substance.

* * * * *